United States Patent [19]

Riewerts et al.

[11] Patent Number: 4,738,653
[45] Date of Patent: Apr. 19, 1988

[54] ROLLER CHAIN DRIVE HAVING A SELF CLEANING ROLLER CHAIN SPROCKET

[75] Inventors: Paul R. Riewerts, Port Byron, Ill.; Larry L. Burkholder, Bettendorf, Iowa

[73] Assignee: Deere & Company, Moline, Ill.

[21] Appl. No.: 3,511

[22] Filed: Jan. 15, 1987

[51] Int. Cl.⁴ .............................................. F16H 7/06
[52] U.S. Cl. ...................................... 474/156; 222/615
[58] Field of Search ............... 474/152, 153, 155–157, 474/160, 162, 212; 305/57; 222/615, 622, 623

[56] References Cited

U.S. PATENT DOCUMENTS

| Re. 30,018 | 6/1979 | Clemens et al. | 474/152 |
| 1,479,349 | 1/1924 | Wickersham | 474/156 X |
| 1,607,940 | 11/1926 | Best | 474/901 X |
| 1,638,140 | 8/1927 | Best | 305/57 |
| 1,852,197 | 4/1932 | Wilson | 474/156 X |
| 3,020,095 | 2/1962 | Backhaus | 474/156 X |
| 3,173,301 | 3/1965 | Miller | 474/156 |
| 3,567,292 | 3/1971 | Amsden | 305/57 |
| 4,116,081 | 9/1978 | Luttrell et al. | 474/156 |
| 4,251,014 | 2/1981 | Salley et al. | 222/615 |
| 4,459,124 | 7/1984 | Newton | 474/210 |

Primary Examiner—James A. Leppink
Assistant Examiner—Thuy M. Bui

[57] ABSTRACT

A self cleaning sprocket for a roller chain comprising a circular disc having a plurality of outwardly extending teeth and between which are formed roller receiving pockets. At the base of each pocket extending radially inwardly therefrom are foreign material receiving niches which receive foreign material driven from the pocket by the engaging roller of the roller chain. The niches are U-shaped and extend from curved portions of the pocket which form the working faces of the sprocket. The sprocket and chain drive associated therewith is particularly well suited for use with an agricultural machine, such as a planter, which is used in a dirty and trashy environment.

8 Claims, 3 Drawing Sheets

ROLLER CHAIN DRIVE HAVING A SELF CLEANING ROLLER CHAIN SPROCKET

BACKGROUND OF THE INVENTION

1. Field of the Invention

The invention is directed to a self cleaning roller chain sprocket having a plurality of radially extending teeth between which are formed a receiving pocket for a chain roller and inwardly thereof is a foreign material receiving niche for receiving foreign material forced therein by the chain roller. A chain drive using this sprocket is particularly well suited for use in an agricultural machine such as a planter.

2. Description of the Prior Art

Sprocket and chain transmission systems are well known in the art and are used in a great variety of machines. Typically, the sprockets are circular metal discs having a plurality of radially extending teeth in which adjacent pairs of teeth form chain roller engaging pockets. The chain comprises a plurality of connecting links between which are mounted a plurality of chain rollers which are received in the sprocket grooves. The American National Standards Institute (ANSI) has formulated standards for designing sprockets based on chain pitch, number of teeth, and chain roller diameter. Typically, ANSI designed sprockets are quite reliable for transmitting motion.

However, when ANSI designed sprockets are used in a harsh and dirty environments, such as in agricultural machinery, they tend to collect foreign material, such as dirt and stalks, which can significantly hinder their performance and endurance. Dirt interfering with the sprockets can lead to two common malfunctions, "jumping" and "wedging". Jumping is the tendency of the chain to jump to climb teeth and may result from the buildup of foreign material in the tooth pocket resulting in an oversized effective bottom diameter. Wedging of the chain over opposite faces of the sprocket teeth results in greater chain tension and can lead to breakage of the sprocket, chain or support bearings. Traditionally, one method for overcoming these problems has been to undersize the bottom diameter of the sprocket to accommodate foreign material buildup. However, this reduces the effective diameter of the sprocket and shifts the chain roller point of contact with the sprocket inwardly. In addition, a pitch line clearance allowance may be added to allow foreign material to work out of the tooth pocket as the chain roller is forced into the tooth pocket. Motorcross riders have been known to file standard sprocket pockets down apparently to better accommodate dirt trapped in the sprocket. However, generally the effect of such filing is the same as the above described undersized bottom diameter.

Traditionally designed chain sprockets have not proved to be entirely satisfactory in agricultural machines, especially planters, because of the nature of their environment. Dirt, stalks and other agricultural material comes into contact with the sprockets resulting in inefficient transfer of energy from or to the sprockets and the chain and may result in breakage of the sprocket.

SUMMARY OF THE INVENTION

It is the object of the present invention to provide a chain sprocket that is especially useful in dirty environments, such as is found in agricultural machines.

The present invention comprises a self cleaning chain sprocket having a plurality of radially extending teeth. Between adjacent teeth are pockets into which is received the rollers of a roller chain. Radially inward from the pocket is a means for receiving foreign material which comprises a niche into which the foreign material is forced by the roller of the roller chain. The pocket is provided with two roller receiving surfaces that are the working faces of the sprocket and which extend into the U-shaped surface of the foreign material receiving niche.

DESCRIPTION OF THE PREFERRED EMBODIMENT

Figure 1:
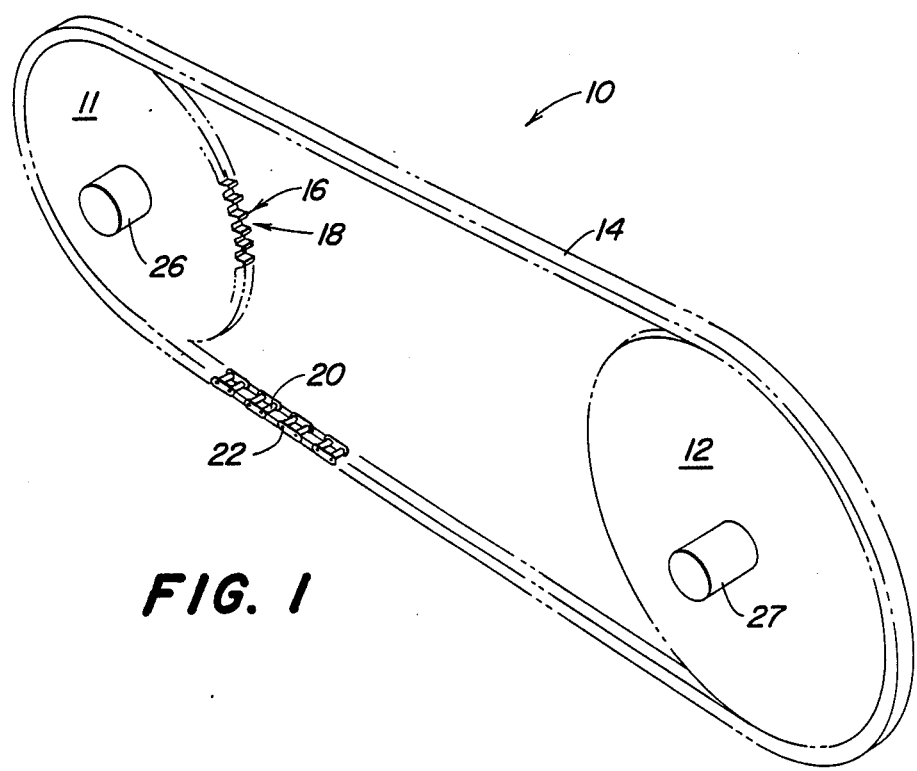
FIG. 1 is a perspective view of a chain sprocket drive.

FIG. 1 illustrates a simple chain drive 10 comprising drive an driven sprockets 11 and 12, respectively, which are operatively coupled to one another by roller chain 14. Both sprockets are circular discs having a plurality of radially outwardly extending teeth 16 between which are formed radially inwardly pockets 18 for receiving rollers 20 of the roller chain 14. The roller chain 14 is rather conventional being provided with connecting links 22 for operatively connecting the rollers to one another. Both chain sprockets are provided with centrally located apertures comprising mounting means for securing the sprockets to drive shafts 27 and 26.

Figure 2:
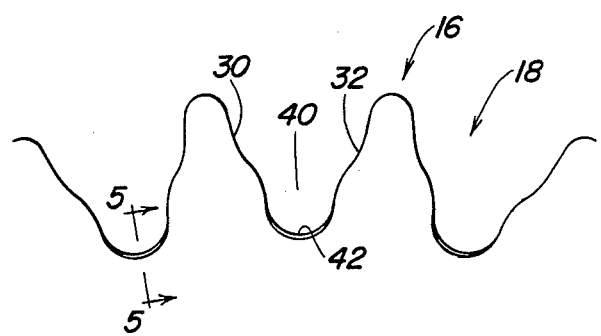
FIG. 2 is a partial side view of a self cleaning sprocket of the present invention.
Figure 3:
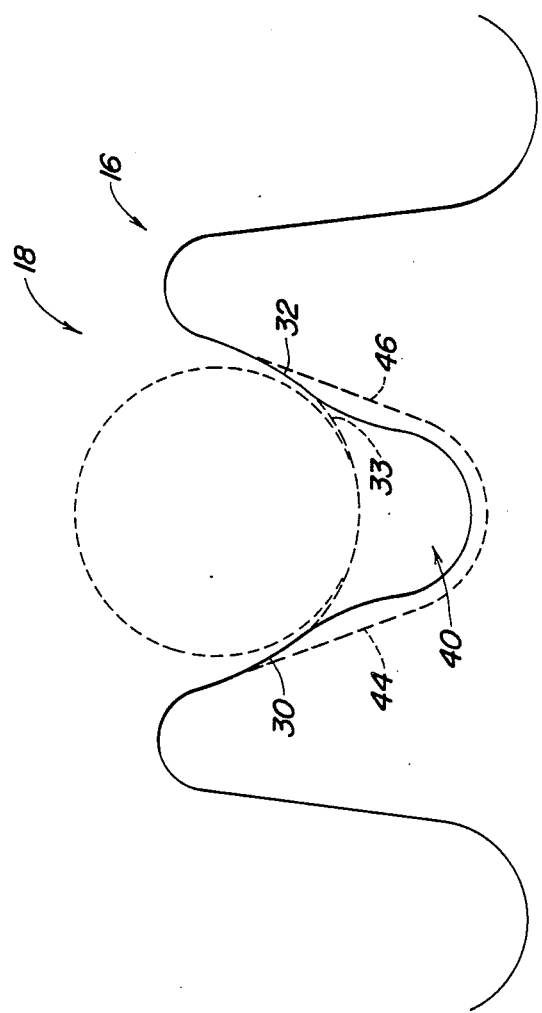
FIG. 3 is an enlarged partial side view of the sprocket showing different tooth and pocket configurations for a chain sprocket in dashed lines.

Drive sprocket 11 is better illustrated in FIG. 2, and comprises a circular disc having a plurality radially outwardly extending teeth 16 and a plurality of radially inwardly extending pockets 18 for receiving the chain rollers. Pockets 18 are formed between adjacent teeth and are defined by two curved surfaces 30 and 32 forming roller receiving surfaces. Curved surfaces 30 and 32 conform to American National Standards Institute's (ANSI) requirements for a chain sprocket and form the working surfaces of the sprocket. Surface 33, shown in dashed lines in FIG. 3, represents the standard (ANSI) shape of the bottom of a pocket. Radially inward from the pocket is a U-shaped niche 40 which forms a foreign material receiving means.

Figure 5:
FIG. 5 is a cross sectional view taken along line 5—5.

In operation chain roller 20 enters the pocket and comes into contact with any foreign material located therein. The roller then forces the foreign material into the niche 40 as it is pressed against the curved working surfaces 30 and 32. The material compressed into the niche then falls off to the sides of the sprocket as it is rotated. To further facilitate this sloughing off of material, edge 42 of the niche may be beveled to act as a transverse wedge driving material transversely, or to act as a knife cutting material compressed against it. Beveled edge 42 is best illustrated in FIG. 5.

One of the key features of the present invention is providing curved working surfaces 30 and 32 which increase the standard operative contact surface between the roller and the sprocket. As illustrated in FIG. 3, these curved surfaces 30 and 32 match the curved surfaces dictated by ANSI requirements. The opening of the niche is less than the diameter of the roller to prevent the roller from entering the niche when not under driving loads. The U-shaped niche is an extension of the curved surfaces providing a receiving area for foreign material. However, the radius of curvature of the edge 42 of the niche 40 is less than the radius of curvature of the surfaces 30 and 32 and of the rollers 20 that engage the surfaces 30 and 32. If the roller receiving pocket was extended radially inward from the sidewalls of the pocket, as illustrated in FIG. 3 in dashed lines 44 and 46, the rollers 20 could slide further inwardly in the pockets than normal and foreign material would be trapped in the lower portion of the pocket. Also, if the pockets are deepended as illustrated by the lines 44 and 46, the roller contact surface on the sprocket is reduced, creating a wear problem.

Figure 4:
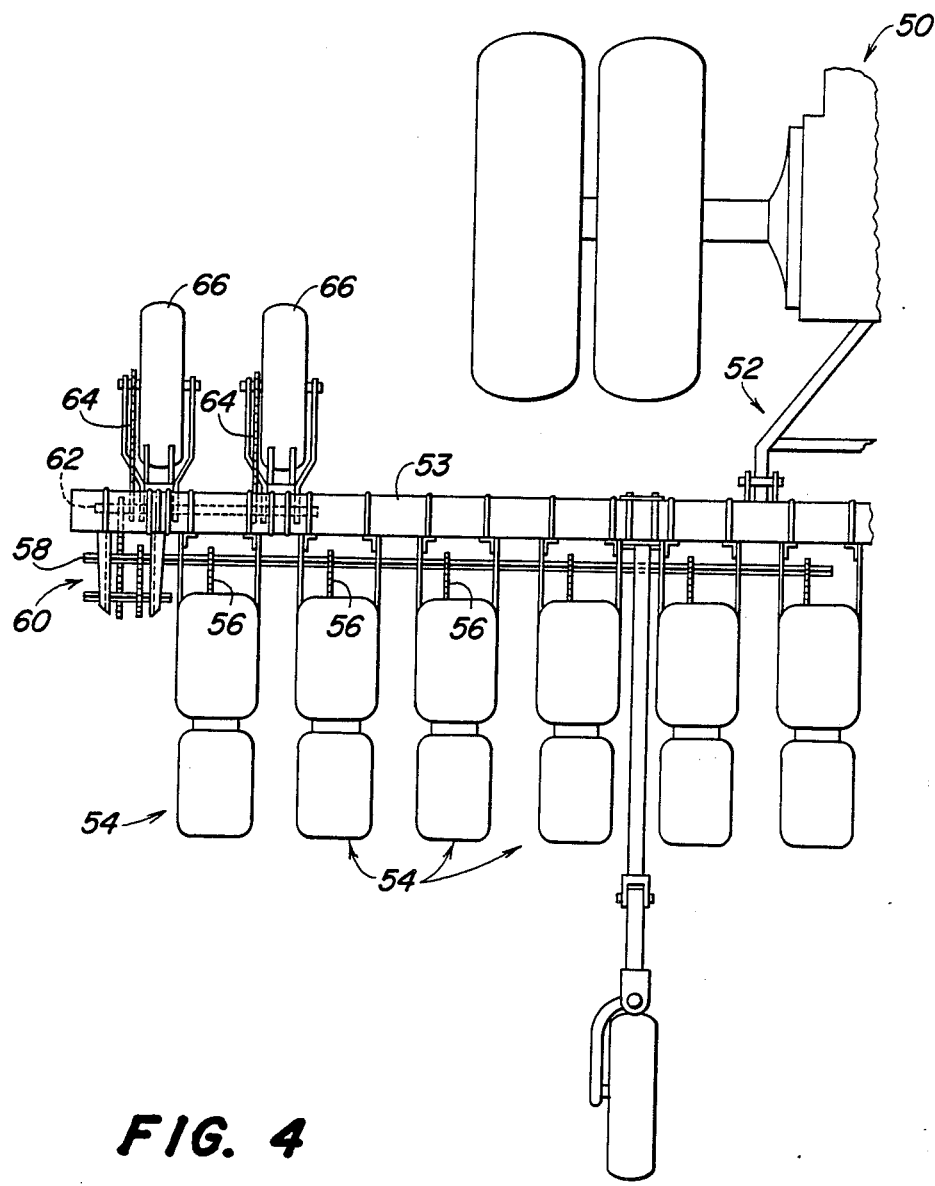
FIG. 4 is a partial overhead view of a planter utilizing the improved chain drive.

A roller chain transmission, such as illustrated in FIG. 1, utilizing the above described self cleaning sprocket is particularly well suited for use in an agricultural machine, due to the dirty environment in which the machine must operate. This is especially true for a planter and more specifically for the drive train of the planter. As illustrated in FIG. 4, a tractor 50 only a rear portion of which is shown, is provided with a hitch 52 for towing a frame 53 on which is mounted a plurality of individual planter units 54. Each planter unit is provided with a chain drive 56 which is operatively coupled to a sprocket located on a rotating shaft 58. The shaft 58 is coupled to a variable speed transmission 60 located at the end of the frame. Similar planter drive trains and variable transmissions that are used in planters, are disclosed in U.S. Pat. Nos. 4,122,974 and 4,251,014 both assigned to the assignee of the present invention. The variable transmission is provided with sprockets and drive chains for operatively coupling the transmission to a stub shaft 62. The stub shaft is provided with a pair of chain drive assemblies 64 which operatively couples the drive stub shaft to drive wheels 66. Therefore, movement of the planter by the tractor rotates drive wheels 66, which one contacting the ground and in turn rotate stub shaft 62, variable transmission 60 and shaft 58, thereby operating the planter.

Chain drive assembly 64 is similar to the chain drive assembly illustrated in FIG. 1 but may be provided with additional idler sprockets and other tensioning means. Chain drive assembly 64 is also the most prone to being encrusted with dirt and becoming entrained with stalks and other crop material because drive wheels 66 are adjacent to the ground. As such, both the drive and driven sprockets of drives 64 are of the self cleaning variety illustrated in FIG. 2. However, it should be noted that the sprockets of the variable transmission and the sprockets located on shaft 58 and in the individual planter units may also include self cleaning sprockets similar to the one illustrated in FIG. 2.

The invention should not be limited to the above-described embodiment, but should be limited solely by the claims that follow.

We claim:
1. An agricultural planter for planting seeds into a field, the planter comprising:
   a frame having a hitching means for coupling the frame to a means for towing the frame through a field;
   a plurality of individual planter units mounted on the frame for placing seeds in individual rows in a field; and
   operating means for operating the individual planter units, the operating means comprising a roller chain having a plurality of rollers operatively coupled to one another by a plurality of links the roller chain is operatively coupled between at least two chain sprockets, at least one of the sprockets being self cleaning and comprising a circular disc having a plurality of radially outwardly extending teeth defining a plurality of inwardly projecting pockets having curved surfaces forming roller receiving means for receiving the rollers and providing the working surface of the sprocket, a U-shaped niche above the bottom of the pocket extending radially inwardly from the roller receiving means defining a foreign material receiving means, the U-shaped niche extending across the circular disc and being sized to substantially prevent the rollers contacting the roller receiving means from entering the niche.

2. An agricultural planter as defined by claim 1 wherein the operating means comprises a drive wheel adapted and constructed for engaging a field over which the planter is moving for rotating the drive wheel, the drive wheel having the self cleaning chain sprocket operatively coupled thereto for transmitting the rotation of the drive wheel through a chain drive to a second sprocket for rotating the second sprocket.

3. An agricultural planter as defined by claim 2 wherein the operating means further comprises a variable transmission which is operatively coupled to the stub shaft to a drive shaft for driving the individual planters.

4. An agricultural planter as defined by claim 3 wherein each individual planter unit is operatively coupled to the driving shaft by a chain drive assembly.

5. An agricultural machine for performing an agricultural operation, the machine comprising:
   a frame;
   a means for performing an agricultural operation; and
   an operating means for operating the means for performing an agricultural operation, the operating means comprising a roller chain having a plurality of rollers operatively coupled to one another by a plurality of links, the roller chain is operatively coupled between at least two chain sprockets, at least one of the sprockets being self cleaning and comprising a circular disc having a plurality of radially outwardly extending teeth defining a plurality of inwardly projecting pockets having curved surfaces forming roller receiving means for receiving the rollers and providing the working surface of the sprocket a U-shaped niche above the bottom of the pocket, extending radially inwardly from the roller receiving means defining a foreign material receiving means, the U-shaped niche extending across the circular disc and being sized to substantially prevent the rollers from entering the niche.

6. A self cleaning chain and chain sprocket power transmission for removing foreign material from the power transmission, the transmission comprising:
   a roller chain having a plurality of connecting links between which are located chain rollers; and
   at least one chain sprocket for receiving the roller chain, the chain sprocket comprising a circular disc having an outer periphery that is provided with a plurality of sprocket teeth; and a plurality of inwardly extending pockets located on the outer periphery of the disc, each pocket is located between adjacent sprocket teeth, each pocket is provided with two curved roller receiving surfaces for receiving and contacting the chain rollers and providing a working surface for the chain roller above the bottom of the pocket, and a niche extending across the circular disc located radially inward from the two curved roller receiving surfaces for receiving foreign material located in the pocket, whereby when the chain rollers are received into the pocket the chain rollers force foreign material into and out of the niche, the niche is sized to substantially prevent the chain roller from entering the niche.

7. A self cleaning chain and chain sprocket power transmission as defined by claim 6 wherein the niche is U-shaped.

8. A self cleaning chain and chain sprocket power transmission as defined by claim 6 wherein the U-shaped niche is provided with a beveled edge.

* * * * *